R. J. ALTGELT.
PLOW.
APPLICATION FILED MAR. 17, 1920.
1,377,047.
Patented May 3, 1921.
3 SHEETS—SHEET 2.
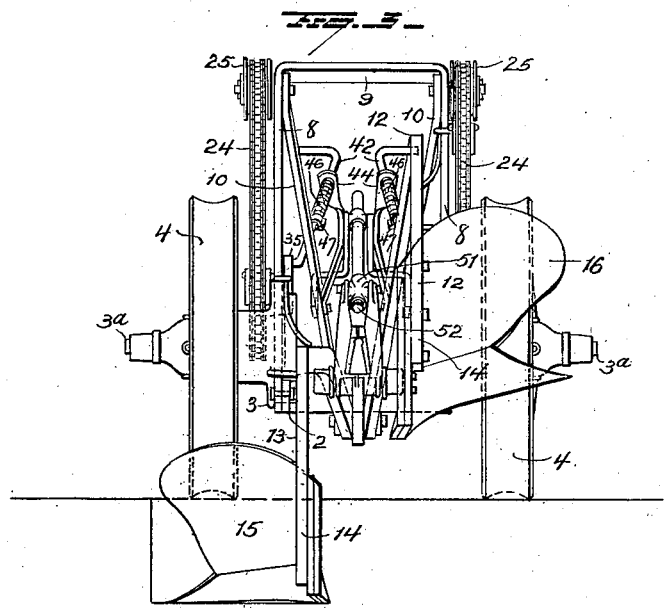
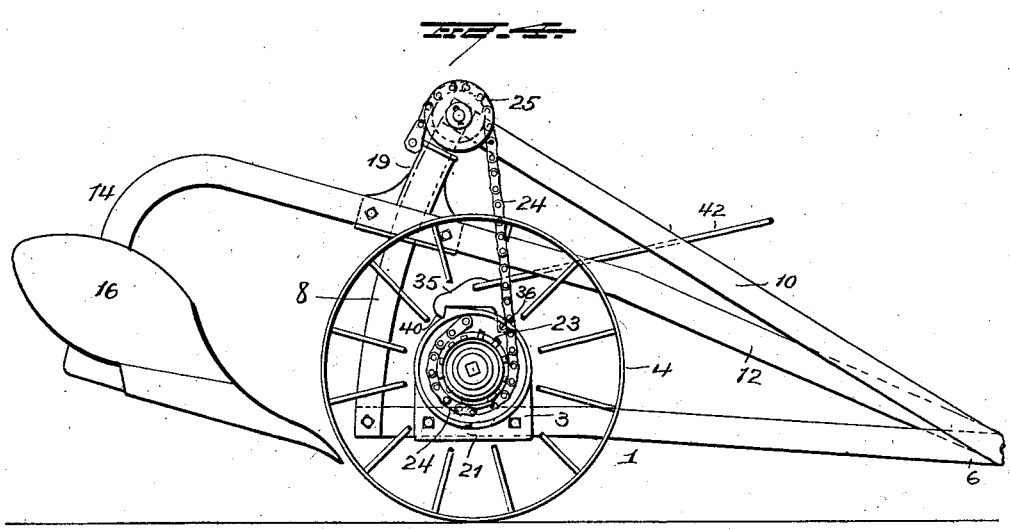
INVENTOR
R. J. Altgelt
By Seymour & Bright
Attorneys

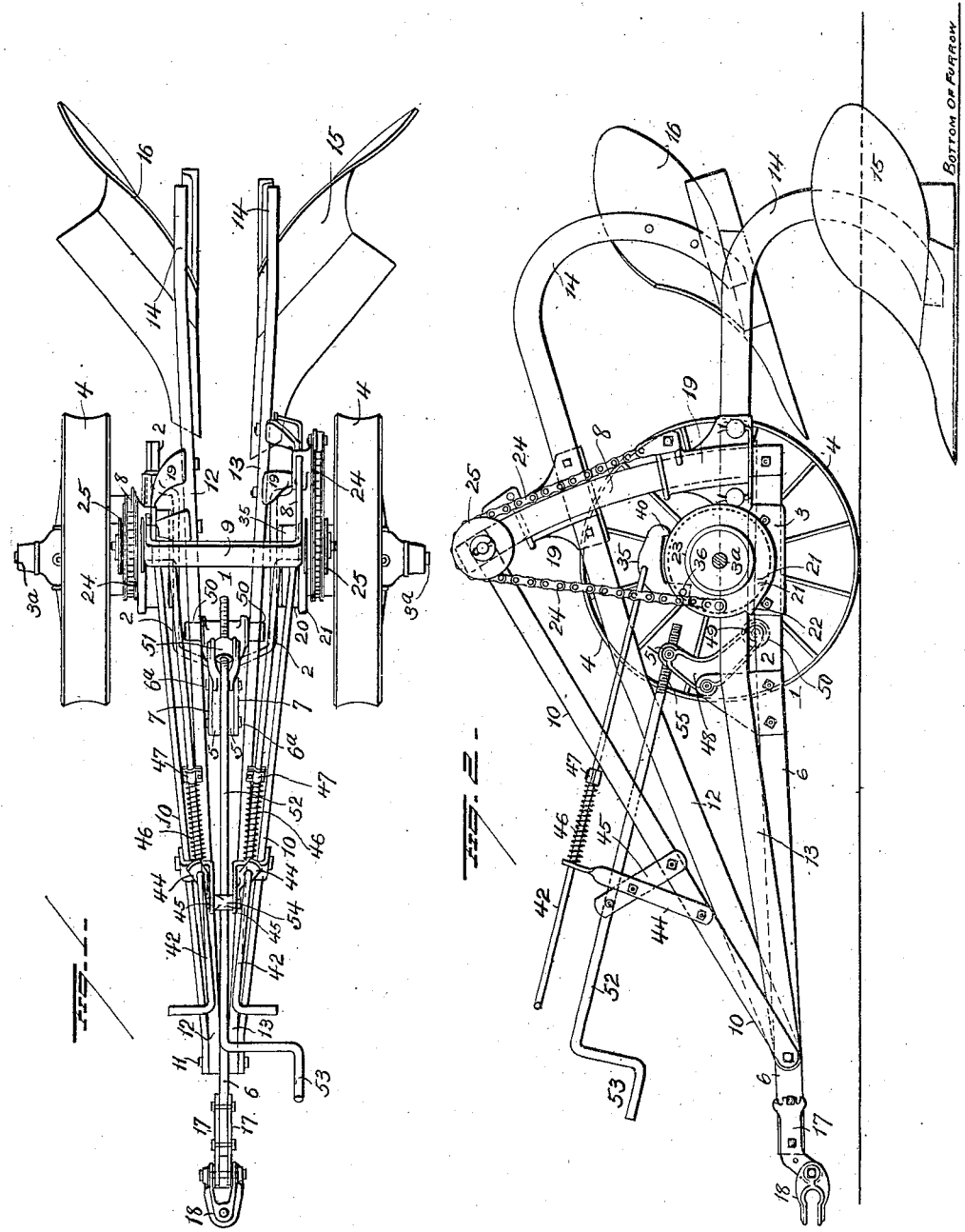

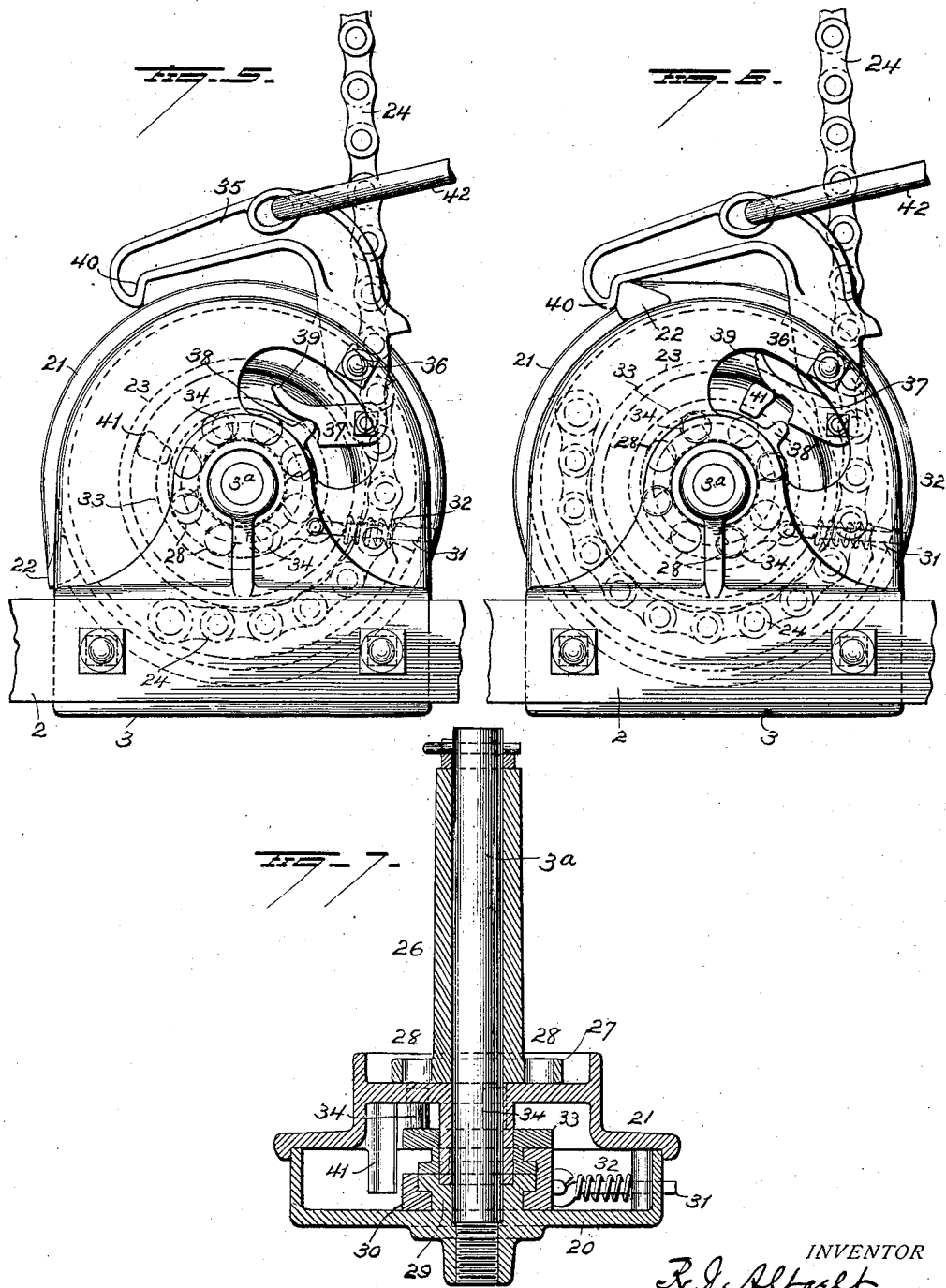

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

PLOW.

1,377,047.     Specification of Letters Patent.     Patented May 3, 1921.

Application filed March 17, 1920. Serial No. 366,617.

*To all whom it may concern:*

Be it known that I, RUDOLPH J. ALTGELT, a citizen of the United States, and a resident of South Bend, in the county of Saint Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to that type known in the art as "two-way" plows,—one object of the invention being to provide a simple two-way plow structure adapted to be drawn by a tractor, in which the axles for the wheels are supported on the frame independently of the plow beams.

A further object is to provide simple means whereby either plow of a two-way plow may be raised by power derived from one or the other carrying wheel of the plow structure.

With these and other objects in view, the invention consists in certain novel features of construction and combinations of parts as hereinafter set forth and pointed out in the claims.

In the accompanying drawings; Figure 1 is a plan view of a two-way plow embodying my improvements; Fig. 2 is a side elevation showing one plow beam and base in raised position and the other in working position; Fig. 3 is a rear view with the parts in the positions shown in Fig. 2; Fig. 4 is a side elevation showing the positions assumed by the lifting mechanism when a plow beam or frame is in raised position, and Figs. 5, 6 and 7 are views illustrating the clutch devices.

1 represents a wheeled frame comprising comparatively short side members 2, 2, to which suitable brackets 3 are secured for the accommodation of fixed straight axle members 3ª for ground wheels 4, 4. The frame members 2, 2 are bent toward each other and terminate in parallel portions 5, 5, between which, the rear end of a central beam or frame member 6 is secured by means of bolts 6ª,—said bolts also securing upright brackets 7 to the frame for a purpose hereinafter explained. The wheeled frame also includes an arch comprising upright curved or segmental bars 8 connected at their upper ends by a cross bar or member 9, and diagonal braces 10 connected at their rear ends to the upper portion of the arch and the forward ends of these brace bars are connected with the forward portion of the central frame beam 6, rearwardly of the forward extremity of the latter, by a bolt 11. Between the forward ends of the braces 10, the forward ends of plow beams 12, 13 are disposed and pivotally connected with the frame by means of the bolt 11,—the rear ends of said plow beams being provided with standard portions 14, 14, to which plow bases 15, 16 are secured, one being disposed reversely with respect to the other as is customary in two-way plows. The central frame beam 6 projects forwardly beyond the forward ends of the frame and of the plow beams and this forwardly projecting portion of the central frame beam constitutes a draw bar to which clevis members 17 are secured. To these clevis members, a coupling yoke 18 may be pivotally attached for connecting the forward end of the wheeled frame with a tractor.

By constructing the wheeled frame as hereinbefore described and with the wheels near its rear end, the forwardly projecting portion of the frame is very narrow and thus close connection of said frame with a tractor is facilitated and danger of conflict of the tractor with the wheeled frame when the tractor is turned relatively thereto, is eliminated.

Elongated and slightly curved tubular guides 19 are secured to the divergent rear portions of the plow beams and are movable on the upright segmental bars 8 when one or the other plow beam is raised or lowered,—such connection of the plow beams with the frame also serving to retain said beams and the plow bases properly spaced.

The brackets 3 serve not only to support the axle members 3ª, but they also provide housings 20 for clutch mechanism, as hereinafter explained. Each housing is closed by a revoluble disk 21 provided on its peripheral portion with a beveled lug 22, and said disk is also provided with a drum 23, to which one end of a chain 24 is secured and on which said chain is adapted to wind. The chains 24 extend upwardly from the drums 23 and after passing over pulleys 25 at the juncture of the guide bars 8 with the brace bar 10, are connected with the guides 19 on the plow beams.

Each wheel is provided with an axle box 26 mounted freely on one of the axle members $3^a$ and is provided at its inner end with an annular flange 27 having holes 28. A threaded hub 29 is made rigid with the housing and an internally threaded ring 30 is adapted to screw on said threaded hub so that, by the cam coöperating action of the threads on the ring 30 and on the hub 29, said ring will be caused to move in a direction parallel to its axis. A rod 31 is pivotally connected with the ring 30 and passes freely through a hole in the peripheral wall of the housing. The clutch mechanism and controlling means above described are not specifically claimed herein but are covered by my copending application Serial No. 388,183. A spring 32 encircling the rod 31, has bearings at its respective ends so that when the ring 30 is turned, it will be retained, by the action of said spring, in the position to which it may be moved, the tendency of said spring being to turn the ring 30 in one direction or the other. The ring 30 is loosely connected with a ring 33 and the latter is provided with pins 34 which pass through holes in the web of the drum 23 and are adapted to enter the holes 28 in the flange 27 to lock the hub box and wheel to the drum 23 and disk 21 and cause the drum to wind the chain 24 thereon and effect the lifting of the plow beam with which it is connected.

The peripheral wall of the housing 20 is notched for the accommodation of a control lever 35 which is pivotally connected with said housing at 36. The arm of this lever which enters the housing has pivoted thereto, a dog 37 to engage a flange 38 on the ring 30 and said dog is provided with a curved tongue 39 for a purpose presently explained. The free outer end of the control lever 35 is provided with a tooth 40 which, under certain conditions, engages the lug 22 on the peripheral portion of the disk 21. A lug 41 projects from the inner face of the disk to engage the tongue 39 of dog 38 and raise the latter out of operative relation to the flange 38 of ring 30. A manually operable rod 42 is connected at 43 with each control lever 35. Brackets 44 are secured to the braces 10 and to brackets 45 also secured to said braces,—the upper portion of said brackets 44 being twisted and having perforations for the passage of the operating rods 42. Springs 46 are located on the rods 42 and bear at respective ends against the brackets 44 and abutments 47 on said rods 42, so as to retain the toothed end of the control levers in and return the same to the position with relation to the disk 21 as shown in Figs. 2 and 4.

The brackets 7 located near the forward ends 5 of the frame bars 2 serve to pivotally support a bell-crank-lever 48, the lower arm of which carries laterally projecting pins 49 on which rollers 50 are mounted,—said rollers being thus located under the plow beams and in position to support one or the other of them in working position. The upper arm of the bell-crank lever is bifurcated and supports a pivoted sleeve 51 having internal screw-threads. A manually operable shaft 52 having a crank handle 53 at its forward end, is mounted to turn freely in a sleeve 54 pivotally supported between the brackets 45, and the rear threaded portion 55 of this shaft passes through the internally threaded sleeve 51 carried by the bell-crank-lever 48. By means of the shaft 52, the bell-crank-lever may be turned to raise or lower the lateral rollers 50 and thus regulate the depth which the plow bases may enter the ground.

The plow supporting means above described are not claimed specifically herein but the same are covered by my copending application Serial No. 366,618.

The operation of the plow is as follows:—

When a plow beam and its base are in working position, with the lug 22 on the disk 21 in the position shown in Fig. 2, and it is desired to raise said beam and its base,—the operator will pull one of the operating rods 42 and cause the corresponding control lever 35 to turn on its pivotal connection with the housing. When the control lever is thus operated, the dog 37 will coöperate with the flange 38 on the ring 30 to turn the latter. The coöperation of the threaded interior of the ring 30 with the threaded hub 29 will cause longitudinal movement of said ring and also the ring 33 and the pins 34 will be projected to enter the holes in the flange 27 of the hub box 26, thus locking the ground wheel to the disk 21 and its drum 23. Forward movement of the plow will now cause the disk and drum to turn with the ground wheel, and the chain 24 will be wound on the drum to raise the plow beam and its base. As the plow beam approaches the limit of its upward movement, the disk 21 will have turned sufficiently to bring the lug 41 in engagement with the flange 38 of the ring 30. Continued movement of the disk 21 will cause coöperation of the lug 41 with the flange 38 to turn the ring 30 and cause withdrawal of the pins 34 from the perforated flange of the hub box, thus releasing the ground wheel and permitting the same to turn freely. As the disk 21 completes its movement, the lug 41 will engage the curved tongue 39 of the dog 28 and cause the latter to be raised out of coöperative relation to the flange 38 of ring 30, and the peripheral lug 22 on said disk to ride past and be engaged by the tooth 40 of the control lever 35 and the plow beam will be locked in its raised position, as shown in Fig. 4.

To permit the raised plow beam to drop to working position, the operator will raise the control lever and cause the release of the disk 21 by movement of the tooth 40 out of engagement with the lug 22. The plow beam is now free to drop upon one of the rollers 50 and assume its working position,—the disk 21 being turned by the chain until it assumes the position shown in Fig. 1.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a tractor drawn two-way plow structure, the combination with a frame including upright guide members, and two ground wheels on which said frame is mounted, of two plow beams pivotally connected with the forward portion of said frame, tubular guiding members secured to the plow beams and movable on said guides, wheels at the upper end portions of said upright guides, drums adapted to be connected with said ground wheels, chains secured to said drums and passing over the wheels at the upper ends of the upright guide members and secured to the tubular guiding members on the plow beams, and separately controlled means for connecting each drum with the adjacent ground wheel.

2. In a tractor drawn, two-way plow, the combination with a frame adapted for construction with a tractor, and ground wheels on which said frame is mounted, of plow beams pivotally connected with the forward portion of said frame, curved upright members forming parts of said frame, guides secured to the plow beams and movable on said curved upright members, winding drums, wheels at the upper ends of said curved upright members, chains connected with the plow beams, passing over said wheels and adapted to wind on said drums, means for connecting said drums with and for disconnecting them from the ground wheels, and means on the frame to support one or the other plow beam in working position.

3. In a tractor-drawn two-way plow structure, the combination of a wheeled frame, means for connecting the forward end thereof with a tractor, plow beams having their forward end portions pivotally connected with the forward portion of said frame, wheel operated power lift mechanism connected with each of said plow beams, and means on the frame for supporting one or the other plow beam in working position.

4. In a tractor-drawn two-way plow structure, the combination of a wheeled frame, means for connecting the forward end thereof with a tractor, plow beams having their forward end portions pivotally connected with the forward portion of said frame, of wheel operated power lift mechanism connected with each of said plow beams, means on the frame for supporting one or the other plow beam in working position, and means forming parts of the power lift mechanism to hold one or the other plow beam in raised position.

In testimony whereof I have signed this specification in the presence of two subscribing witnesses.

RUDOLPH J. ALTGELT.

Witnesses:
OLIVE M. CULP,
BESSIE E. WOYAHN.